(12) United States Patent
Carson

(10) Patent No.: US 6,357,708 B1
(45) Date of Patent: Mar. 19, 2002

(54) HANDLEBAR CLAMP FOR WATER BOTTLE CAGE

(76) Inventor: Robert T. Carson, 324 Gardenia Ave., Camarillo, CA (US) 93010

( * ) Notice: Subject to any disclaimer, the term of this patent is extended or adjusted under 35 U.S.C. 154(b) by 0 days.

(21) Appl. No.: 09/359,825

(22) Filed: Jul. 23, 1999

(51) Int. Cl.[7] .......................... A47B 96/06; E04G 3/00; F16B 1/00; G09F 7/18
(52) U.S. Cl. .................................. 248/229.1
(58) Field of Search .................. 248/229.1, 229.15, 248/229.12, 214, 311.2, 312.1, 313, 213.2, 130

(56) References Cited

U.S. PATENT DOCUMENTS

| | | | | |
|---|---|---|---|---|
| 2,439,623 A | * | 4/1948 | Howells | 224/29 |
| 3,269,683 A | * | 8/1966 | Shinaver | 248/230 |
| 3,603,549 A | * | 9/1971 | Brilando | 248/230 |
| 4,345,704 A | | 8/1982 | Boughton | 224/39 |
| D272,139 S | | 1/1984 | Boughton | D12/114 |
| 4,437,596 A | | 3/1984 | Shook | 224/39 |
| D285,186 S | | 8/1986 | Sinyard | D12/114 |
| 4,998,652 A | | 3/1991 | Champagne | 224/39 |
| 5,060,832 A | | 10/1991 | Link | 224/32 |
| 5,127,709 A | * | 7/1992 | Rubinstein et al. | 297/444 |
| 5,145,138 A | | 9/1992 | Schlanger et al. | 248/311.2 |
| D332,240 S | | 1/1993 | Schlanger et al. | D12/114 |
| 5,566,916 A | | 10/1996 | Bailey | 248/230.1 |
| 5,597,148 A | * | 1/1997 | Gospodarich | 248/311.2 |
| D392,081 S | * | 3/1998 | Salvucci, Sr. | 248/311.2 |
| 5,752,687 A | * | 5/1998 | Lynch | 248/311.2 |
| 6,076,792 A | * | 6/2000 | Dozeman | 248/311.2 |
| 6,082,583 A | * | 7/2000 | Bussell et al. | 222/1 |

* cited by examiner

Primary Examiner—Leslie A. Braun
Assistant Examiner—A. Joseph Wujciak
(74) Attorney, Agent, or Firm—Marvin E. Jacobs

(57) ABSTRACT

A clamp for a water bottle cage having a mounting plate with spaced apertures comprising a first part having a rear hemispherical cavity, a front face having threaded bores having the same spacing as the apertures on the plate and a rear face having spaced threaded bores receives threaded fasteners for fastening the plate to the clamp. A second part having a front hemispherical cavity and spaced apertures receives threaded fasteners for clamping a water bottle cage to tubing such as the handlebar of a bicycle.

9 Claims, 1 Drawing Sheet

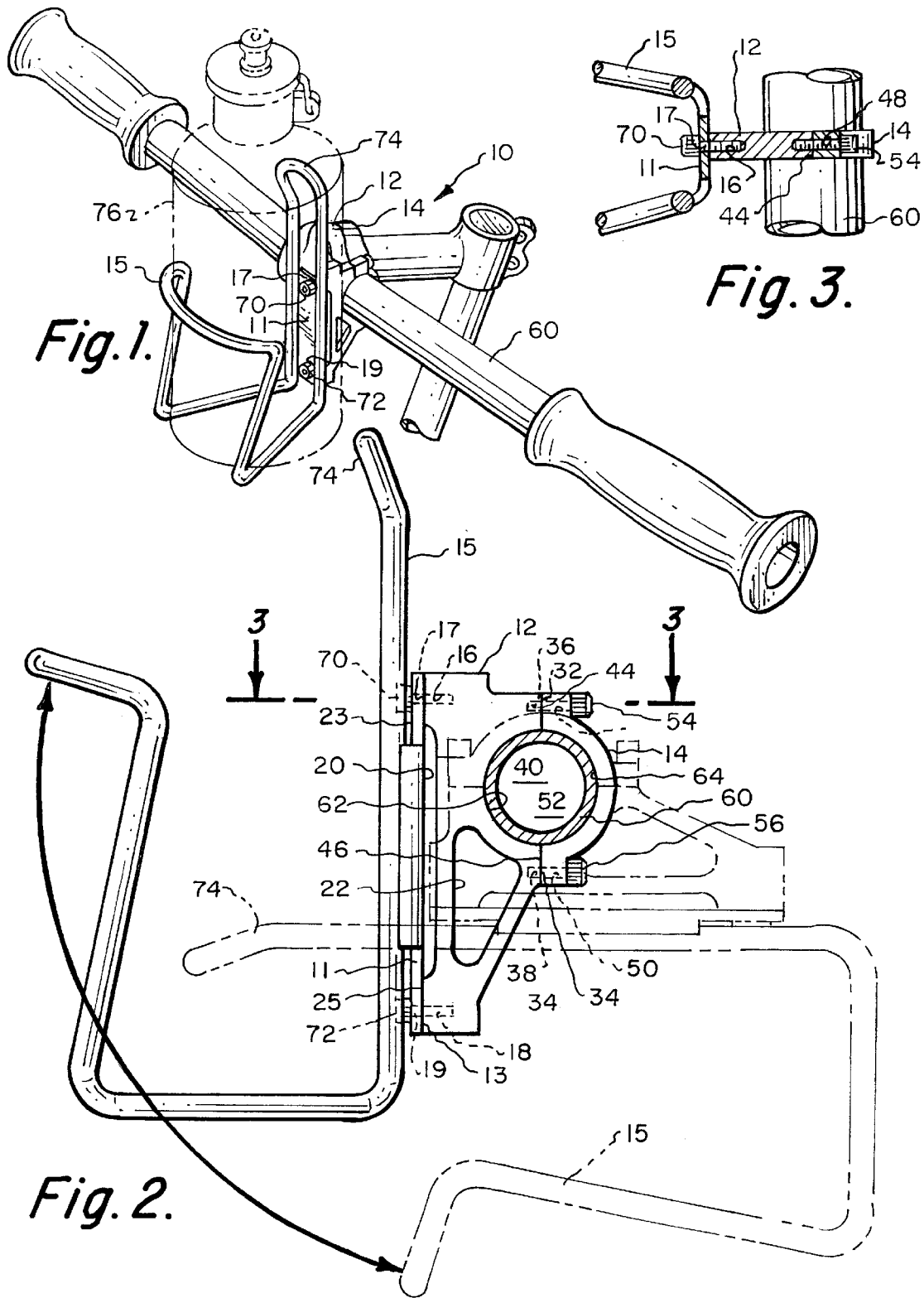

HANDLEBAR CLAMP FOR WATER BOTTLE CAGE

TECHNICAL FIELD

This invention relates to mounting plastic water bottles on tubular frame members and more particularly, this invention relates to a clamp for mounting a water bottle holder on a handlebar of a vehicle, particularly a bicycle.

BACKGROUND OF THE INVENTION

Refillable plastic water bottles with a removable top have come into wide use by people during extended indoor or outdoor exercise. Holders have been developed to carry the bottle on the person or on exercise apparatus during exercising. In the case of bicycles, the plastic water bottles are inserted into a wire cage by interference fit. The cage has a mounting plate which is secured to tubular members of the bicycle frame so as to be within reach of the bicycle rider while riding. The frame is tapped with a pair of spaced threaded openings. The plate has a set of apertures matching the spacing of the openings and the plate is secured by passing threaded bolts through the aperture and threading them into the openings. Such cage mounting systems are disclosed in U.S. Pat. Nos. 4,386,721 (Shimano) and 4,437,596 (Shook).

Tapping the frame can weaken the frame and can chip and/or crack the protective barrier paint and sealer layer exposing the tubing to corrosion. Tapping the tubing at the factory requires locating the water bottle in preset locations. Also, long distance bicycle enthusiasts can carry tube mounted air pumps and tool kits. It gets very crowded. Also small frame bicycles for children may not have enough space to mount the cage or to allow easy insertion and removal of the water bottle.

Mounting the water bottle cage below the frame is not the best ergonomic location and it can be hazardous. The rider must bend, reach and pull the bottle to remove it from the tight interference with the cage while balancing the bike with one side of his body and body weight off center. The rider does not have as good a control of the bike with one hand on the handlebars and while in a bent position. The rider is vulnerable to falling if the thin tires hit a piece of debris on the road or to hitting a parked or a moving vehicle.

| List of References | |
|---|---|
| 4,998,652 | Champagne |
| 5,060,832 | Link |
| 4,437,596 | Shook |
| D 285,186 | Sinyard |
| 5,566,916 | Bailey |
| D 272,179 | Boughton |
| 4,345,704 | Boughton |
| D 332,240 | Schlanger |
| 5,145,138 | Schlanger |

STATEMENT OF THE PRIOR ART

The Boughton patents disclose bottle holders with the clamps attached to a split sleeve water bottle holder tube. Clamp is split in a plane perpendicular to the axis of the bottle holder. Sinyard's handlebar clamping straps are connected to vertical flange having spaced apertures for receiving fasteners to mount a water bottle cage. Bottle cages with spaced apertures on the rear wall are disclosed in the Schlanger patents. Shook shows a set of spaced cradle blocks to mount a water bottle cage parallel to bicycle tubing. An after market belt clamp bracket for mounting water bottle cages with axis parallel to the tubing is disclosed by Champagne. Link discloses a tube clamp for mounting a water bottle case parallel to tubing. A U-bolt pipe brace is disclosed by Bailey.

STATEMENT OF THE INVENTION

A clamp for adapting the conventional water bottle cage to transverse mounting on bicycle tubing is provided by this invention. The clamp is split into two mating, thin parts. The front part has a rear semi-circular cavity having a radius just slightly less than the diameter of the tubing of the vehicle and a front face having tapped bores spaced the same distance apart as the mounting plate on the conventional bottle cage. The rear face of the front part also has a set of tapped bores above and below the semi-circular cavity.

The rear part has a matching semi-circular cavity and apertures on each side of the cavity spaced the same distance apart as the rear facing tapped bores on the first part.

The clamp is attached to tubing such as a handlebar by placing the two parts onto the tubing with the apertures aligned with the tapped bores and placing a set of screws or bolts through the apertures into engagement with the threaded bores.

A water bottle cage can be transversely mounted on the clamp by aligning the holes in the mounting plate with the tapped bores in the front flange and screwing fasteners through the holes into the tapped apertures in the front flange.

The water bottle can now be inserted into the cage. The water bottle faces the rider. The bottle can be pulled out of the cage and used without bending sideways or taking ones eyes of f the road. This is very important during aggressive riding in abusive environments such as BMX racing or biking on rough mountain trails.

The clamp can be located anywhere on the handlebar without restricting use of other equipment. A center mounted bracket would prevent use of a center light. The clamp can be made out of a light alloy such as aluminum or an engineering plastic such as Nylon. The semi-circular gripping surfaces can be roughened or contain ridges to increase frictional hold with the tubing. Bushings can be used to mount the bracket on tubing having smaller diameters such as children's bicycles or tricycles. The tapped apertures can readily be lowered on the front flange to locate the bottle cage below the handlebar to prevent contact with the rider should he/she flip forward over the handlebars. The clamp can also be rotated to position the cage in a plane below and parallel to the handlebars. The bracket of the invention can be formed by machining or extrusion.

The water cage clamp of the invention is readily fabricated and is simple to use. It positions the water bottle in sight of the rider. It is ergonomic to use and frees the tubing below the seat for holding other apparatus such as air pumps, tool bags, accessory bags, etc. The clamp can be used on the tubing of other exercise equipment such as stationary bikes or strollers used for jogging.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a perspective view of the handlebar clamp for mounting a water bottle cage according to the invention;

FIG. 2 is a view in section of the handlebar clamp shown in vertical position and in phantom rotated to a horizontal position; and FIG. 3 is a view in section taken along line 3—3 of FIG. 2.

DETAILED DESCRIPTION OF THE INVENTION

Referring now to FIGS. 1 and 3 the clamp 10 comprises a front part 12 and a rear part 14. The front part 12 includes a flange 13 having a front face at least as long as the spaced holes 17, 19 on the mounting plate 11 of a conventional water bottle cage 15. The flange is tapped to form apertures 16, 18 spaced the same distance apart as the holes 17, 19 in the plate 11. The face portions 23, 25 of the flange 13 surrounding the apertures 16, 18 are flat to provide a close fit with the rear face of the plate 11 on the bottle cage 15. The material between the tapped apertures 16, 18 may be removed to form a recess 20 to provide space for the welds adjacent the mounting plate 11. A transverse cavity 22 may be formed in the front part to reduce the weight of the part.

The rear face 30 of the flange 13 has two flat surfaces 32, 34. Threaded taps 36, 38 are provided on the flat surfaces 32, 34. The taps are spaced apart a distance larger than the diameter of the tubing on which the clamp 10 is to be mounted. A semi-circular recess 40 having a diameter slightly smaller than the tubing is provided between the taps 36, 38.

The rear part of the clamp 10 has a front face 42 having flat surfaces 44, 46 containing bores 48, 50 spaced the same distance apart as the taps 36, 38. A semi-circular recess 52 having the same diameter as the recess 40 is formed inbetween the bores 48, 50.

The clamp 10 is assembled on handlebar tubing 60 by placing one part such as front part 12 over the tubing and aligning rear part 14 with the front part 12 with the bores 48, 50 in alignment with the taps 36, 38. Threaded fasteners 54, 56 are inserted through the bores 48, 50 into engagement with the taps 36, 38 and screwed in until the rough inner surfaces 62, 64 of the semi-circular cavities 40, 52 frictionally engage the tubing 60.

A water bottle cage 15 as shown is attached to the clamp 10, by aligning the apertures 17, 19 in the mounting plate 11 with the threaded taps 16, 18 in the front face portions 23, 25 in the front part 22 of the clamp 10 and placing fasteners 70, 72 through the apertures 17, 19 into engagement with the threaded taps 16, 18 and tightening the fasteners 70, 72. However, the top end 74 of the bracket 15 presents a hazard when no bottle is carried in the cage 15.

As shown in FIG. 2, the bracket 15 can be rotated to a horizontal position under the handlebar 60 with the upper end 74 and the bottle 76 facing outwardly. The bottle is still in a better ergonomic position for the rider to reach, remove and replace a water bottle 76 than the standard position on the frame tubing under the seat of a bicycle.

The clamp can contain a longer flange with the threaded apertures offset to the lower end of the front face of the flange. This permits the clamp and bottle to be disposed below the tubing for safety.

The brackets of the invention are very rigid and strong and can withstand rugged use in challenging environments such as mountain trail riding. The thickness of the flange is typically from about 1/8 inch to about 1/2 inch, usually about 1/4 inch. The split cavity for a 1 inch bike handlebar tubing usually has a diameter of no more than about 1/8 inch less than the tubing. Automated manufacturing from a solid billet is envisioned.

It is to be realized that only preferred embodiments of the invention have been described and that numerous substitutions, modifications and alterations are permissible without departing from the spirit and scope of the invention as defined in the following claims.

What is claimed is:

1. A tubing clamp for use with a tubular water bottle cage having a metal mounting plate welded to rods forming weld lines on a face of the mounting plate, said mounting plates having a pair of spaced apertures corresponding to the spacing between threaded inserts on bicycle tubing frame for mounting said cage on said tubing or on bicycle handlebar tubing comprising in combination:

a first part having a front face and a rear face;

the front face containing an upper and lower extension each with a flat face, a recess being formed between said extensions to receive said weld lines, said flat faces each containing an upper and lower threaded bore spaced apart the same distance as said spaced apertures on the mounting plate;

the rear face containing a rear facing hemispherical first cavity having a diameter slightly smaller than the tubing and having a top edge and a bottom edge, a first flange adjacent each of said edges and a first threaded bore present on each of said first flanges;

a second part having a front face and a rear face, a front facing hemispherical second cavity having the same diameter as the first cavity and having a top edge and a bottom edge;

a second flange adjacent the edges of the second cavity each having a surface mating with a rear surface of the first flanges;

an aperture provided on each of said second flanges; and a set of fasteners each having a threaded shaft received through said flange apertures and into said threaded bores for clamping said parts on said tubing.

2. The tubing clamp according to claim 1 in which said parts are formed of metal.

3. The tubing clamp according to claim 2 in which the metal comprises aluminum.

4. The tubing clamp according to claim 1 in which the front face of the first part contains a recess between said flanges.

5. The tubing clamp according to claim 1 in which the surfaces of said hemisphere cavities are roughened to increases friction.

6. The tubing clamp according to claim 1 in which the upper bore in the first part is adjacent the top of the first part.

7. The tubing clamp according to claim 6 in which the threaded bore in the rear face of the top part is adjacent the top of the first part.

8. The tubing clamp according to claim 1 in which the mating faces of the first and second part are parallel to the longitudinal axis of the clamp.

9. The tubing clamp according to claim 1 in which the tubing is a bicycle handlebar.

* * * * *